United States Patent [19]
Whitaker

[11] Patent Number: 4,526,394
[45] Date of Patent: Jul. 2, 1985

[54] APPARATUS FOR CONVERTING A TRAILER HAVING A CANTILEVERED REACH INTO A TRAILER HAVING A REACH EXTENDING BETWEEN SPACED-APART SETS OF WHEELS

[75] Inventor: Gene C. Whitaker, Wilbur, Oreg.

[73] Assignee: Whitlog, Inc., Wilbur, Oreg.

[21] Appl. No.: 473,029

[22] Filed: Mar. 7, 1983

[51] Int. Cl.³ .......................... B60D 1/00; B62D 53/00
[52] U.S. Cl. .................................... 280/404; 280/418; 280/423 A; 280/476 R
[58] Field of Search ............... 280/423 A, 418, 476 R, 280/476 A, 408, 404

[56] References Cited
U.S. PATENT DOCUMENTS 2,524,633 10/1950 Orjala ............................. 280/418 X
3,189,365 6/1965 Blacher .......................... 280/418 X
4,226,436 10/1980 Donaldson ......................... 280/404

FOREIGN PATENT DOCUMENTS 973395 2/1951 France ............................ 280/476 R
615607 1/1949 United Kingdom ............ 280/476 R Primary Examiner—John A. Pekar
Attorney, Agent, or Firm—Chernoff, Vilhauer, McClung, Birdwell & Stenzel

[57] ABSTRACT

A wheeled dolly is provided having a fixed coupler which permits the dolly to rigidly connect to the end of the cantilevered reach of a wheeled trailer. The dolly and trailer can be connected together to form a trailer having a reach extending between spaced-apart sets of wheels.

10 Claims, 5 Drawing Figures

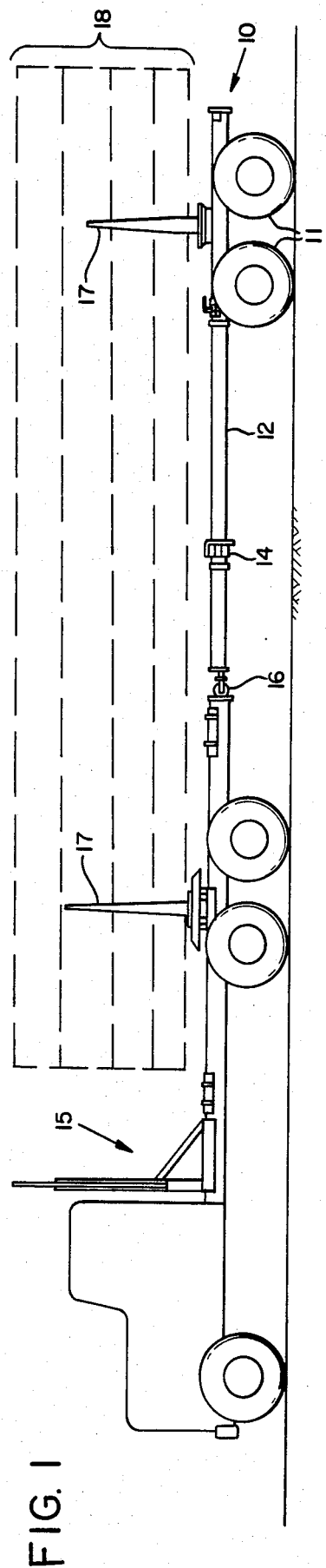
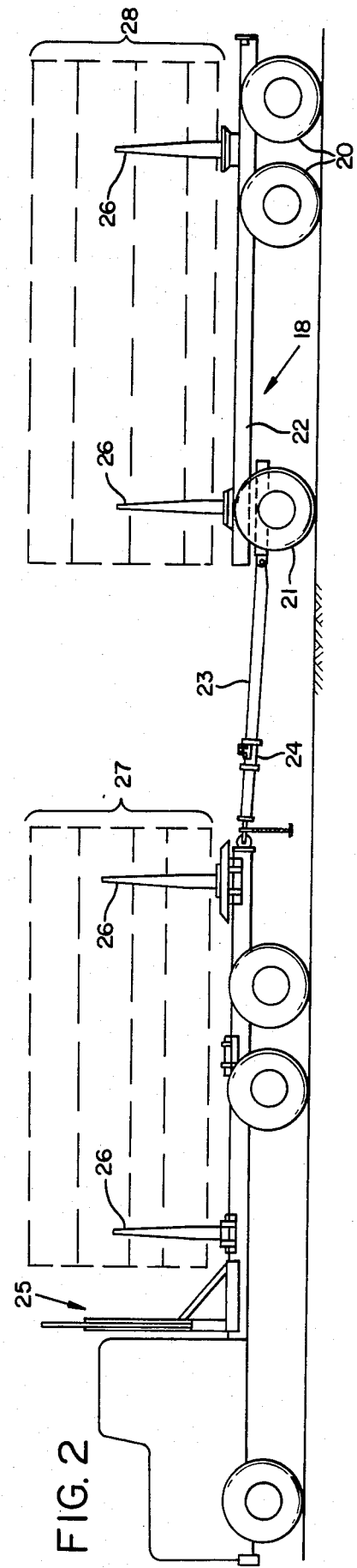
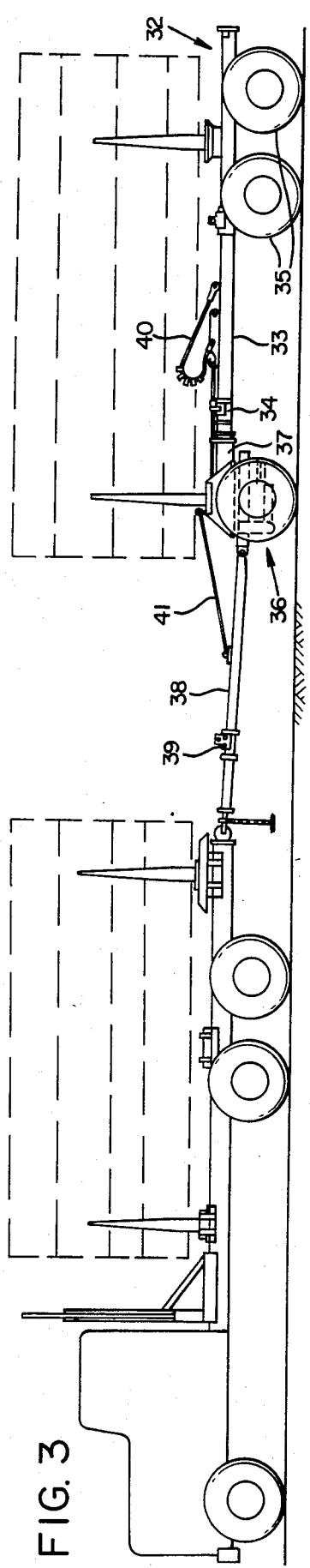

APPARATUS FOR CONVERTING A TRAILER HAVING A CANTILEVERED REACH INTO A TRAILER HAVING A REACH EXTENDING BETWEEN SPACED-APART SETS OF WHEELS

BACKGROUND OF THE INVENTION

The present invention relates to a wheeled dolly for converting a long-log trailer having a cantilevered reach into a short-log trailer having a reach extending rigidly between spaced-apart sets of wheels. More particularly, the invention relates to a wheeled dolly having a coupler which is capable of connecting rigidly to the end of the cantilevered reach of the long-log trailer so that the dolly and the long-log trailer can be joined to form the short-log trailer.

In the logging industry, cut logs are transported on rigs consisting of a tractor which is coupled to one or more wheeled trailer assemblies. Logs exceeding a certain length are transported on "long-log" rigs, one of which is illustrated in FIG. 1. A long-log rig typically comprises a wheeled trailer having a telescoping cantilevered reach which is connected to a tractor. Raised bunks are placed over the rear wheels of the tractor and the wheels of the trailer for supporting the logs.

Shorter logs are transported on a "short-log" rig such as is illustrated in FIG. 2, comprising a unitary trailer having spaced-apart sets of wheels, which is connected by a tongue to a tractor. Pairs of bunk assemblies are positioned on the bed of the tractor assembly and on the trailer assembly to support two sets of logs.

Presently, a trucker must keep both short-log and long-log trailer assemblies on hand in order to be able to transport both types of logs economically since truck size is regulated with respect to both weight and length. This can result in substantial costs associated with the acquisition, storage and maintenance of log trailers.

Another problem associated with existing short-log trailers is that the distance between the spaced-apart sets of wheels is fixed. Thus they normally are sized to carry the shortest logs which will be transported. As a result, there exist logs which are too long to be carried on a short-log trailer, due to excessive overhang, and yet are short enough that it is not economically efficient to haul them on a long-log trailer, due to the low total load weight. Furthermore, the distance between load-bearing axles is normally controlled by state law, and the requirement can vary from state to state. Thus, a short-log trailer used in interstate commerce must conform to the minimum length allowed along its route of travel, resulting in lost revenue in states where the length allowance exceeds the length of the trailer.

A possible solution to the problems described above would be to provide a set of modular components which can be easily assembled and disassembled to provide the short-log or long-log trailer configurations as needed. One approach that has been tried is to adapt the long-log trailer to attach to a wheeled dolly having a fifth wheel. This would allow making a short-log trailer from a long-log trailer by interconnecting the dolly between a tractor and the long-log trailer. However, this is not a desirable solution because the fifth wheel suspension permits the front end of the short-log trailer to move vertically with respect to the ground which can result in a potentially dangerous shifting of the load of logs.

Accordingly, the problem is to provide a set of modular assemblies which can be assembled to form a short-log trailer which will carry a load of logs in a substantially horizontal position with respect to the ground.

SUMMARY OF THE PRESENT INVENTION

The present invention is directed to an improvement in log trailer construction for the purpose of solving the foregoing problems. The invention comprises a wheeled dolly for converting a long-log trailer having a cantilevered reach into a short-log trailer having a reach which extends rigidly between two sets of wheels. The dolly is provided with a coupler which rigidly and releasably attaches to the end of the cantilevered reach. The result is a short-log trailer which will maintain a level load, and whose length can be varied to adapt to different load or legal requirements.

More particularly, the present invention comprises a dolly for converting a trailer having an elongate cantilevered reach into a trailer having a reach which extends between spaced-apart sets of wheels. The dolly includes a chassis having a pair of wheels rotatably mounted about a transverse axle. A steering assembly is provided for rotating the wheels relative to the chassis about an axis which is perpendicular to the axle. The end of the cantilevered elongate reach, rather than being connected to a suspended coupler such as fifth wheel, is instead connected to a fixed coupler on the dolly which rigidly retains the elongate reach.

The coupler of the present invention includes a housing for receiving the end of the cantilevered reach and for retaining the cantilevered reach rigidly with respect to the housing. A cover is hingedly attached to the housing and pivots between an open position which permits placement of the end of the cantilevered reach into the housing, and a closed position which retains the end of the reach in the housing. A locking assembly holds the cover in the closed position.

Accordingly, it is a primary objective of the present invention to provide a dolly which is used to convert a trailer having a cantilevered elongate reach into a trailer having a reach which extends rigidly between spacedpart sets of wheels. It is a salient feature of the present invention that the length between the spaced-apart wheels of the resulting trailer can be varied to adapt the length of the trailer to particular requirements.

The foregoing and other objectives, features and advantages of the present invention will be more readily understood upon consideration of the following detailed description of the invention, taken in conjunction with the accompanying drawings.

BRIEF DESCRIPTION OF THE DRAWINGS

FIG. 1 is a side view of a long-log transporting rig including a trailer having a cantilevered reach.

FIG. 2 is a side view of a short-log transporting rig including a trailer having a fixed wheel-base.

FIG. 3 is a side view of an exemplary embodiment of the dolly of the present invention shown interconnected between a trailer having a cantilevered reach and a tractor.

DETAILED DESCRIPTION OF THE INVENTION

Figure 4:
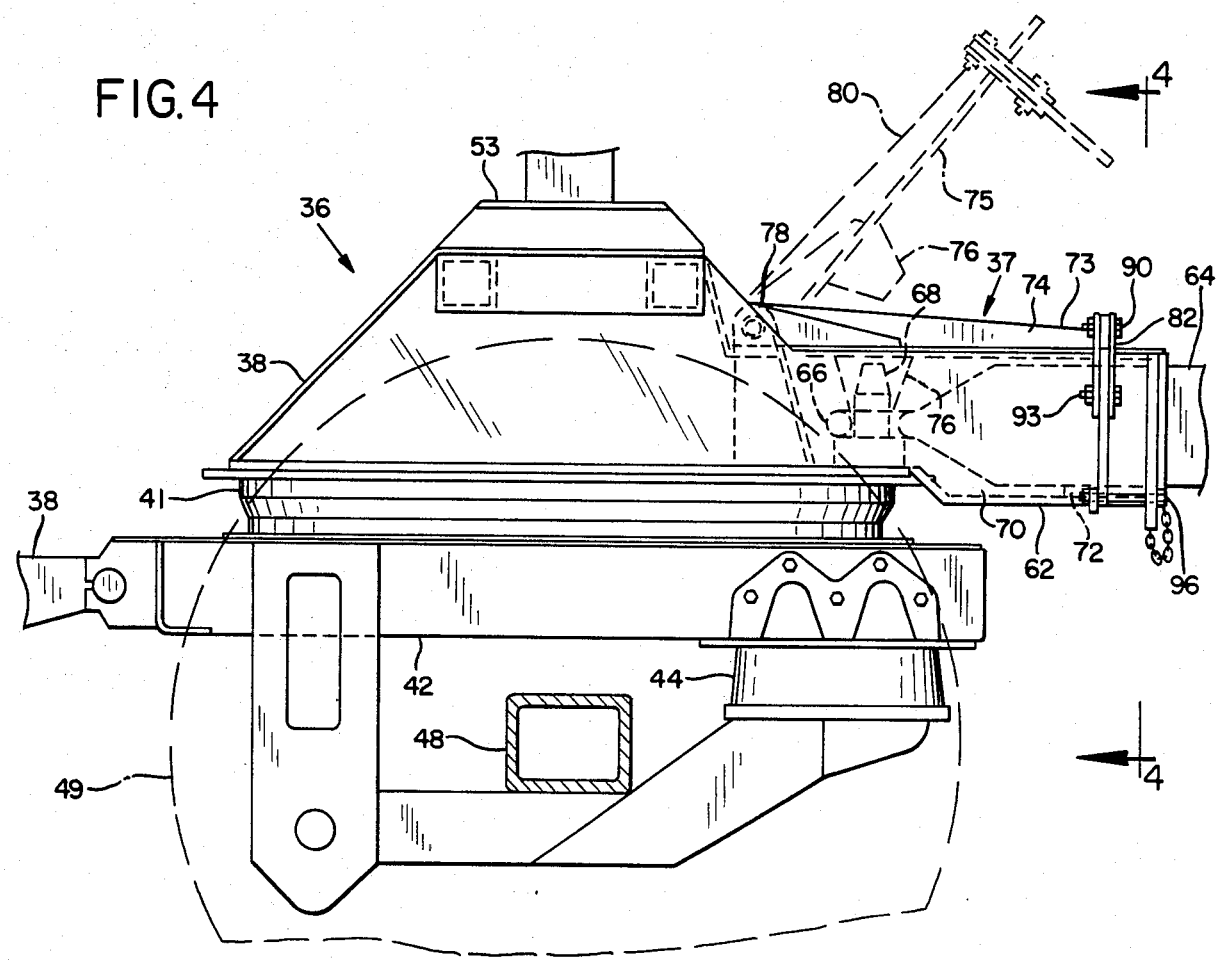
FIG. 4 is an enlarged partial side view of the dolly showing a coupler for rigidly releaseably connecting to the end of a cantilevered elongate reach.

With reference to FIG. 1, a rig suitable for handling long logs is illustrated. A long-log trailer 10 includes a set of wheels 11 to which is attached a cantilevered reach 12 having a telescoping assembly 14 which allows the length of the reach to be varied. The trailer is connected to a tractor 15 by means of an attaching assembly 16, many of which are well known in the art. Bunk assemblies 17 are positioned over the rear axles of the tractor 15 and the wheels 11 on the cantilevered trailer 10. A load of logs 18 is placed on the bunk assemblies and spans the distance between the rear wheels of the tractor 15 and the wheels 11 of the cantilevered trailer 10.

The configuration of a rig suitable for hauling short logs is illustrated in FIG. 2. A short-log trailer 18 includes a set of rear wheels 20, a set of front wheels 21, and a fixed reach 22 which extends between the rear and front wheel sets. A tongue 23 is provided at the leading edge of the forward wheel set 21 and includes a telescoping assembly 24 which permits its length to be varied. The short-log trailer is connected by any well-known method to a tractor 25. Bunk assemblies 26 are positioned on the tractor 25 and on the short-log trailer 18. One set of short logs 27 is carried on the bunk assemblies of the tractor 25, and another set 28 on the bunk assemblies of the short-log trailer 18.

FIG. 3 illustrates how an embodiment of the dolly of the invention can be used to convert a long-log trailer, similar to the one illustrated in FIG. 1, into a short-log trailer which may be used in place of the trailer 18 illustrated in FIG. 2. In FIG. 3, the long-log trailer 32 has a cantilevered reach 33 with a telescoping assembly 34 which is attached by any well-known manner to a set of wheels 35. Forward of the cantilevered reach 33 is a dolly 36 which has mounted thereon a coupler 37 which rigidly releasably connects to the cantilevered reach 33 near its end. The coupler 37 is fixed to the dolly 36. Consequently, the rigid connection between the coupler 37 and the cantilevered reach 33 provides a continuous fixed connection between the trailer 32 and the dolly 36. It is evident that the combination of the dolly and the trailer, with the telescoping cantilevered reach 33 connected rigidly and fixedly therebetween, forms a trailer having spaced-apart sets of wheels which, with the provision of appropriately-positioned bunk assemblies, corresponds to the short-log trailer illustrated in FIG. 2. Furthermore, the provision of the telescoping assembly 34 on the now rigidly fixed reach 33 permits the wheel base of the trailer to be adjustably changed.

The trailer comprising the dolly 36 and the long-log trailer 32 can be connected to a tractor by means of a tongue 38 having a telescoping assembly 39, the tongue being connected by any well known method between the tractor and the trailer. In addition, a pivoting engagement assembly 40 is mounted on the reach 33 to provide a lifting point. As is known in the art, the engagement assembly 40 is folded down when not in use to lie underneath the load of logs which may be placed on the bunk assemblies. The engagement assembly is coupled by means of a pulley and line assembly 41 to the tongue 38. When the engagement assembly is pivoted to an upright position, the coupling assembly 41 will cause an upward pull to be exerted on the tongue 38. The upward pull will cause the tongue 38 to pivot upward if it is disconnected from the tractor.

Figure 5:
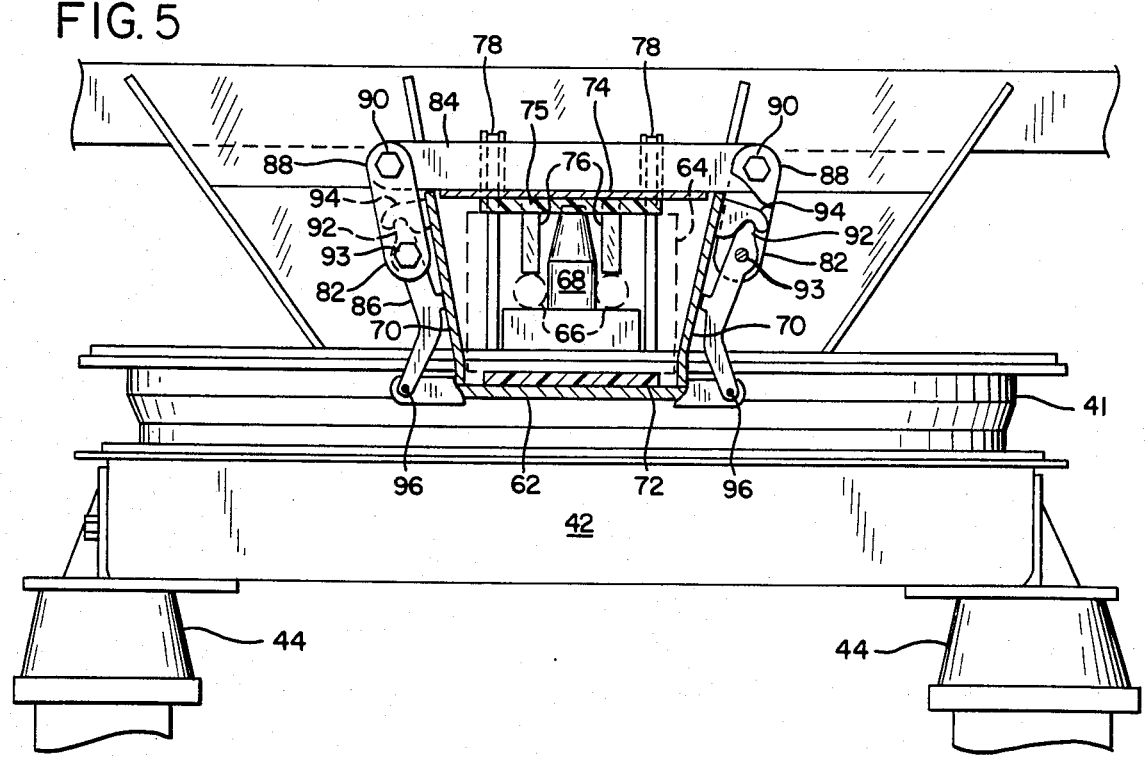
FIG. 5 is a partial sectional view of the dolly coupler taken along lines 4—4 of FIG. 4.

The assembly of the dolly can be understood with reference to FIGS. 4 and 5. The dolly 36 includes an upper chassis 38 mounted on a ring-bearing assembly 41 which, in turn, is attached to a lower chassis frame 42. A pair of suspension assemblies 44 are attached to the lower frame assembly and are spanned by an axle assembly 48 at either end of which are attached a pair of wheels, one of which is represented by the circular, dashed line 49 in FIG. 4. Suspension and axle asemblies appropriate for the purpose of the invention are well known in the art and any may be used without limiting the scope of the invention. A bunk assembly 53 is fixedly attached to the upper portion of the upper chassis 38 to provide a support surface for logs.

With the arrangement of parts illustrated in FIGS. 4 and 5 and described hereinabove, the ring-bearing assembly 41 provides the lower chassis frame 42 with the capability of being pivoted underneath the upper chassis 38 about an axis which is perpendicular to the axle 46. This permits the converted trailer which includes the dolly 36 to be steered.

The coupler 37 of the dolly 36 comprises a housing 62 which receives the forward end 64 of the cantilevered reach 33. The forward end of the cantilevered reach includes a closed ring 66 which fits over a fixed pin 68 located in the rear end of the housing 62. The housing 62 also includes a pair of walls 70 and a bottom spacer 72 upon which a portion of the bottom surface of the forward end of the cantilevered reach rests when it is placed in the housing. A cover assembly 73 includes a cover plate 74 carrying on its lower surface first spacer means such as upper spacer 75. The cover plate also carries on the back portion of its lower surface second spacer means, such as the pair of spaced-apart ears 76 which extend perpendicularly therefrom. The cover plate is pivotally mounted on a pair of spaced-apart gudgeons 78 which are fixedly attached to the upper chassis 38 rearwardly of the housing assembly 62. The gudgeons allow the cover plate to be pivoted between a closed position where it rests upon the housing assembly as illustrated in FIGS. 4 and 5, and an open position represented by the dashed outline 80 in FIG. 4.

In operation, the cover assembly 73 is pivoted to its upward open position which allows the end 64 of the cantilevered reach 33 to be placed in the housing assembly 62 with the ringed portion 66 of the end engaging the pin 68. The cover assembly 73 is then pivoted downwardly upon the housing assembly to its closed position wherein it is locked by a locking assembly 82, described in greater detail hereinbelow. With the cover assembly in the closed, locked position, the spaced-apart ears 76 contact the ringed portion 66 of the end of the cantilevered reach, thereby holding it on the pin 68, which prevents the cantilevered reach 33 from moving along its longitudinal axis. The end 64 of the cantilevered reach is prevented by the housing walls 70 from moving horizontally or pivoting about the pin 68. The bottom spacer 72 and the top spacer 75 act in opposition to vertically clamp the end of the cantilevered reach within the housing 62 which prevents the reach from moving in a vertical direction when the cover assembly 73 is locked in its closed position.

The cover assembly 73 is locked to the housing assembly 72 by a pair of locking assemblies 82. Each locking assembly is pivotally mounted to a respective end of a bracket 84 which is attached to the top of the cover plate 74. A locking assembly comprises a pair of connecting brackets 88, each of which are pivotally connected by, for example, a nut and washer assembly 90, to respective sides of an end of bracket 84. A finger link 86 is pivotally connected between the connecting brackets 88 by, for example, a nut and bolt assembly 93. A locking assembly is operated when the finger link 86 is maneuvered to a position where the tip 92 of the finger link engages a locking bracket 94 mounted on the outside surface of a wall of the housing assembly. With the tip thus engaged, the finger link 86 is pivoted toward the housing assembly to a position where it is held by a locking pin 96 which extends through a locking bracket attached to the outside surface of the housing wall and through the lower end of the finger link 86.

The terms and expressions which have been employed in the foregoing abstract and specification are used as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A dolly for converting a trailer having an elongate cantilevered reach into a trailer having a reach which extends between spaced-apart sets of wheels, said dolly comprising:
   (a) a chassis;
   (b) at least one pair of wheels rotatably mounted about a transverse axle;
   (c) steering means for rotating said wheels relative to said chassis about an axis substantially perpendicular to said axle;
   (d) housing means for receiving at least a portion of said elongate reach and for retaining it tightly with respect to said housing means;
   (e) cover means associated with said housing means;
   (f) means for movably mounting said cover means on said housing means for movement between an open position which permits placement of said portion into said housing and a closed position which retains said portion in said housing means; and
   (g) locking means for locking said cover means in said closed position.

2. The dolly of claim 1 wherein said housing means comprises:
   (a) spacer means for preventing vertical movement of said elongate reach;
   (b) wall means for preventing lateral movement of said elongate reach; and
   (c) engagement means for preventing movement of said elongate reach along its longitudinal axis.

3. The dolly of claim 1 wherein said cover means comprises:
   (a) plate means
   (b) first spacer means mounted on said plate means for preventing vertical movement of said elongate reach; and
   (c) second spacer means mounted on said plate means for preventing movement of said elongate reach along its longitudinal axis.

4. The dolly of claim 3 wherein said housing means comprises:
   (a) bottom spacer means cooperating with said first spacer means for preventing vertical movement of said elongate means;
   (b) wall means for preventing lateral movement of said elongate reach; and
   (c) engagement means cooperating with said second spacer means for preventing movement of said elongate reach along its longitudinal axis.

5. The trailer of claim 1 wherein said housing means comprises:
   (a) spacer means for preventing vertical movement of said elongate reach;
   (b) wall means for preventing lateral movement of said elongate reach; and
   (c) engagement means for preventing movement of said elongate reach along its longitudinal axis.

6. The trailer of claim 1 wherein said cover means comprises:
   (a) plate means
   (b) first spacer means mounted on said plate means for preventing vertical movement of said elongate reach; and
   (c) second spacer means mounted on said plate means for preventing movement of said elongate reach along its longitudinal axis.

7. The trailer of claim 6 wherein said housing means comprises:
   (a) bottom spacer means cooperating with said first spacer means for preventing vertical movement of said elongate means;
   (b) wall means for preventing lateral movement of said elongate reach; and
   (c) engagement means cooperating with said second spacer means for preventing movement of said elongate reach along its longitudinal axis.

8. The trailer of claim 7 wherein said elongate reach is a telescoping elongate reach.

9. A trailer comprising:
   (a) a rear set of wheels;
   (b) an elongate reach rigidly connected to said rear set of wheels and extending forwardly therefrom;
   (c) a dolly having a chassis with at least a pair of wheels rotatably mounted about a transverse axis and steering means for rotating said wheels relative to said chassis about an axis substantially perpendicular to the axle;
   (d) housing means associated with said dolly for receiving at least a portion of said elongate reach and for retaining it rigidly with respect to said housing means;
   (e) cover means associated with said housing means;
   (f) means for movably mounting said cover means on said housing means for movement between an open position which permits placement of said portion into said housing and a closed position which retains said portion in said housing means; and
   (g) locking means for locking said cover means in said closed position.

10. A dolly for converting a trailer having an elongate cantilevered reach into a trailer having a reach which extends between spaced-apart sets of wheels, said dolly comprising:
    (a) a chassis;
    (b) at least one pair of wheels rotatably mounted about a transverse axis;
    (c) steering means for rotating said wheels relative to said chassis about an axis substantially perpendicular to said axle;
    (d) housing means for receiving at least a portion of said elongate reach and for retaining it rigidly with respect to said housing means; and
    (e) means for securing said elongate reach in said housing means.

* * * * *